Patented Apr. 24, 1923.

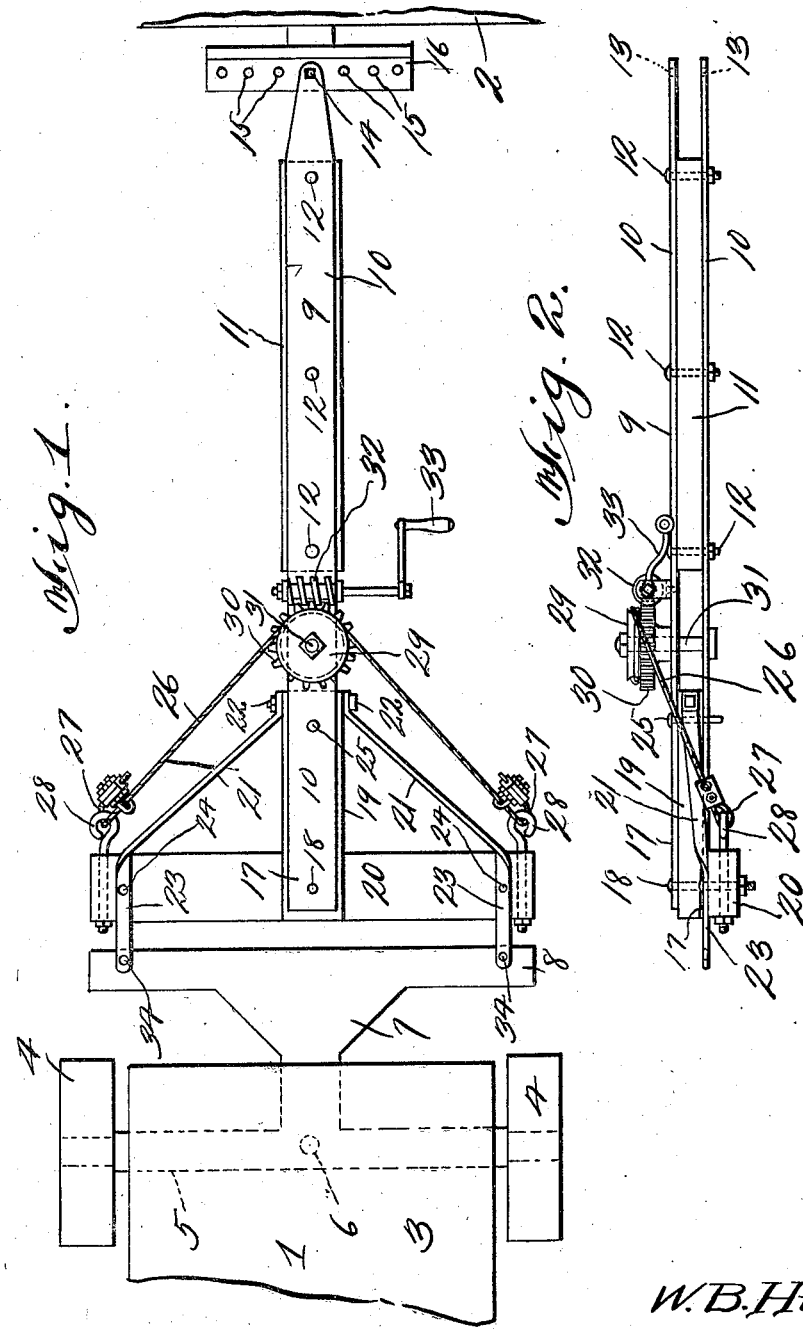

1,452,876

UNITED STATES PATENT OFFICE.

WILLIAM B. HUGHES, OF NEWCASTLE, INDIANA.

VEHICLE TONGUE.

Application filed March 29, 1922. Serial No. 547,761.

*To all whom it may concern:*

Be it known that I, WILLIAM B. HUGHES, a citizen of the United States, residing at Newcastle, in the county of Henry, State of Indiana, have invented a new and useful Vehicle Tongue; and I do hereby declare the following to be a full, clear, and exact description of the invention, such as will enable others skilled in the art to which it appertains to make and use the same.

The invention relates to tongues particularly adapted for use in connection with threshing machines, and has for its object to provide a tongue having a transversely disposed pivoted member at its rear end and at a right angle to the tongue and to which member the threshing machine may be attached. Also to provide means whereby the transversely disposed member may be moved in a horizontal plane to various angles in relation to the tongue, thereby allowing the threshing machine to be steered to either side independently of the tractor to which the tongue is connected, thereby allowing the operator to avoid rocks, stumps, mud holes or gate posts and also allowing short turning.

A further object is to pivotally mount a transversely disposed bar between rearwardly extending plates carried by the tongue, and to provide the transversely disposed bar with a forwardly extending arm through which arm and the plates a securing pin passes for holding the transversely disposed bar against movement.

A further object is to provide gear, pulley and cable means for controlling the movement of the transversely disposed bar.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the tongue, showing a portion of a threshing machine and a portion of a tractor for pulling the threshing machine.

Figure 2 is a side elevation of the tongue.

Referring to the drawing, the numeral 1 designates one end of a threshing machine, and 2 a conventional form of tractor used for moving the threshing machine from place to place. The threshing machine end 3, which is shown, is supported on wheels 4 carried by a transversely disposed axle 5, which is pivoted at 6 to the threshing machine and provided with forwardly extending arms 7 terminating in a transversely disposed bar 8. A conventional form of structure is set forth above, and it is to be understood that this structure may vary according to the type of threshing machine or other vehicle being towed.

The tongue 9 comprises spaced bars 10 in parallel relation to each other by the beam 11, through which beams and bars securing bolts pass. The forward ends of the bars are provided with apertures 13 through which a securing bolt 14 passes, which bolt passes through any of the apertures 15 of the draw plate 16 carried by the tractor 2. The hitching device to the tractor may be of any construction desired, and the one shown is for illustrative purposes only. Extending through the rear ends 17 of the bars 10 is a bolt 18 and pivotally mounted on the bolt 18 and disposed between the ends 17 of the bars 10 is a forwardly extending arm 19. Pivoted on the bolt 18 and beneath the lower bar 10 is a transversely disposed guide bar 20, which bar is disposed at a right angle to the arm 19 and held rigidly at a right angle to the arm 19 by means of the outwardly and rearwardly extending braces 21, the forward ends of which are connected at 22 to the arm 19 and the rearward ends terminating in rearwardly extending arms 23, which are connected at 24 to the transversely disposed guide bar 20. It will be seen that when the arm 19, or the guide bar 20 moves, the arm and bar will be simultaneously moved and maintained at a right angle to each other. Extending through the bars 10 and through the forward end of the arm 19 is a removable pin 25, which pin when in position as shown in Figure 2 prevents movement of the arm 19 and the guide bar 20, thereby allowing the tongue and the tractor 2 to tow the threshing machine 1 in the usual manner. However it has been found in towing machinery of this character that it is necessary to make short turns incident to sharp turn in the road bed, gate posts in passing through gates, mud hole or other obstructions and to accomplish this result cable 26 is provided. The ends of the cable are connected at 27 to eye bolts 28 carried by the ends of the guide bar 20, and the cable passes around a pulley 29, which pulley is carried by a worm gear 30 disposed in a horizontal plane and rotatably mounted on a bolt 31 extending through the bars 10, therefore it will be seen that when the worm 32 is rotated which meshes with the worm gear 30, and which is rotated by the crank handle 33 after the securing pin 25 has been removed, that either end of the guide bar 20 may be moved forwardly or rearwardly for guiding the threshing machine 1 to either side or for causing a short turn, therefore it will be seen that obstructions may be avoided and the handling of the threshing machine facilitated.

From the above it will be seen that a tongue is provided, which is simple in construction, and so constructed that a vehicle which is being towed behind another vehicle may be easily and quickly steered to avoid obstructions and making short turns. It will also be seen that the guide bar 20 may be locked against movement and at a right angle to the tongue 9 thereby allowing towing in the ordinary manner. The rear ends of the arms 23 are connected at 34 to the bar 8, and consequently to the steering mechanism of the threshing machine 1.

The invention having been set forth what is claimed as new and useful is:—

A towing bar for threshing machines, said bar being formed from spaced plates, a spacing member between said plates and terminating spaced from the ends of the plates, an arm pivoted between said plates adjacent their rear ends and extending forwardly, means passing through the plates and preventing movement of the arm, a transversely disposed bar pivoted to the underside of the lower plate, braces connecting the transversely disposed bar and the forward end of the arm, a gear pivotally mounted on the upper side of the upper plate, a pulley carried by the upper side of said gear, a cable extending entirely around said pulley and having its ends connected to the transversely disposed bar adjacent its ends, a worm meshing with the gear and a crank carried by said worm.

In testimony whereof I have signed my name to this specification in the presence of two subscribing witnesses.

WILLIAM B. HUGHES.

Witnesses:
 FRED SAINT,
 G. K. HEWIT.